April 19, 1927.
A. J. TANNER
RAILWAY AND LIKE FARE SYSTEM AND MEANS USED THEREWITH
Original Filed Sept. 19, 1919   3 Sheets-Sheet 1
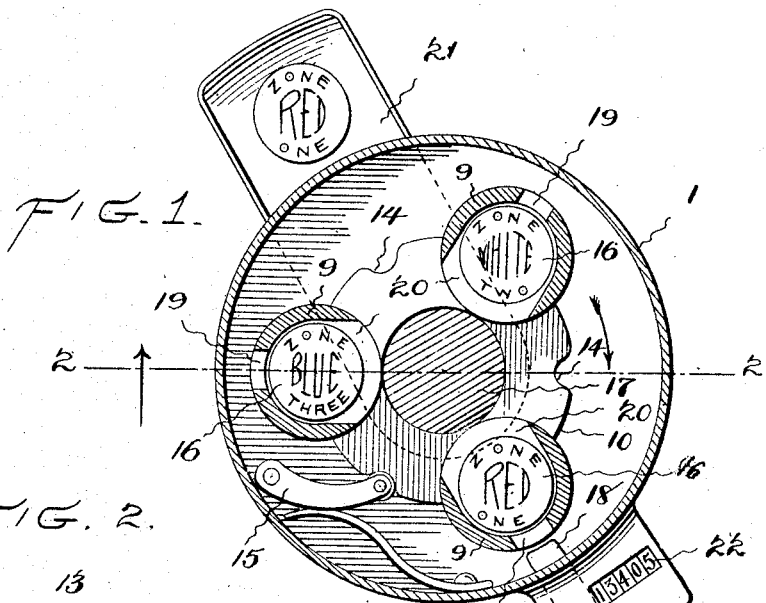
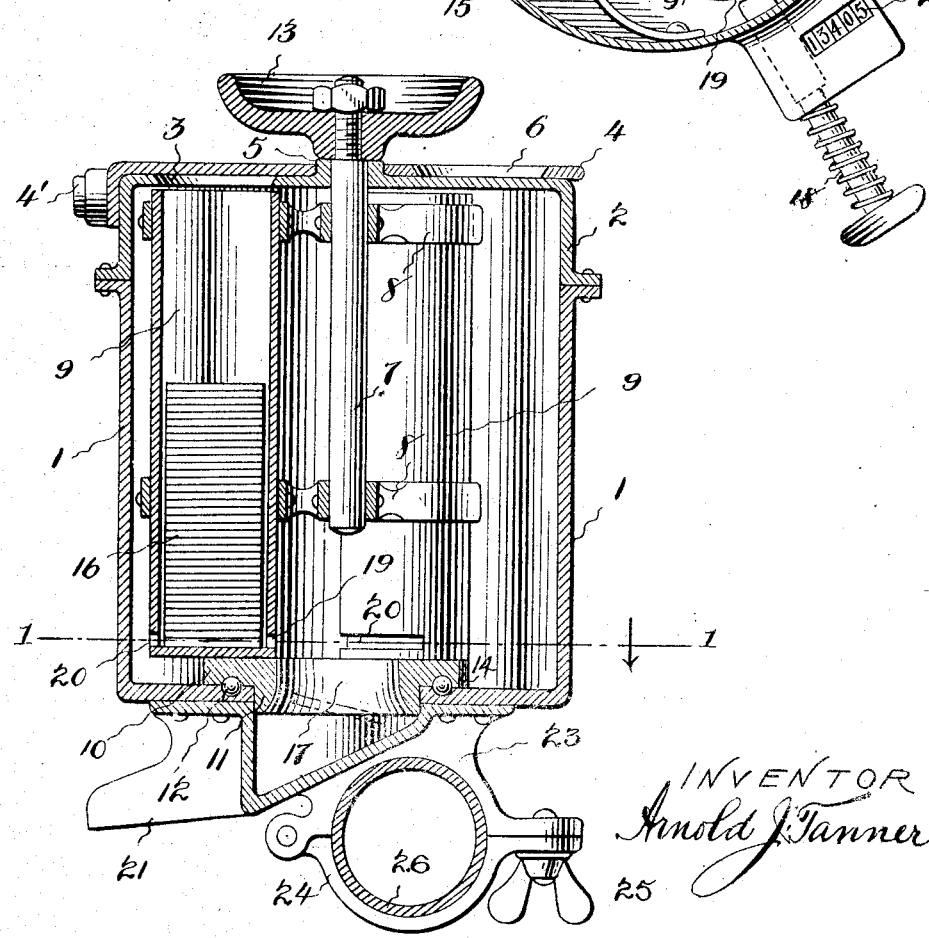
INVENTOR
Arnold J. Tanner April 19, 1927.
A. J. TANNER
1,625,170
RAILWAY AND LIKE FARE SYSTEM AND MEANS USED THEREWITH
Original Filed Sept. 19, 1919   3 Sheets-Sheet 2
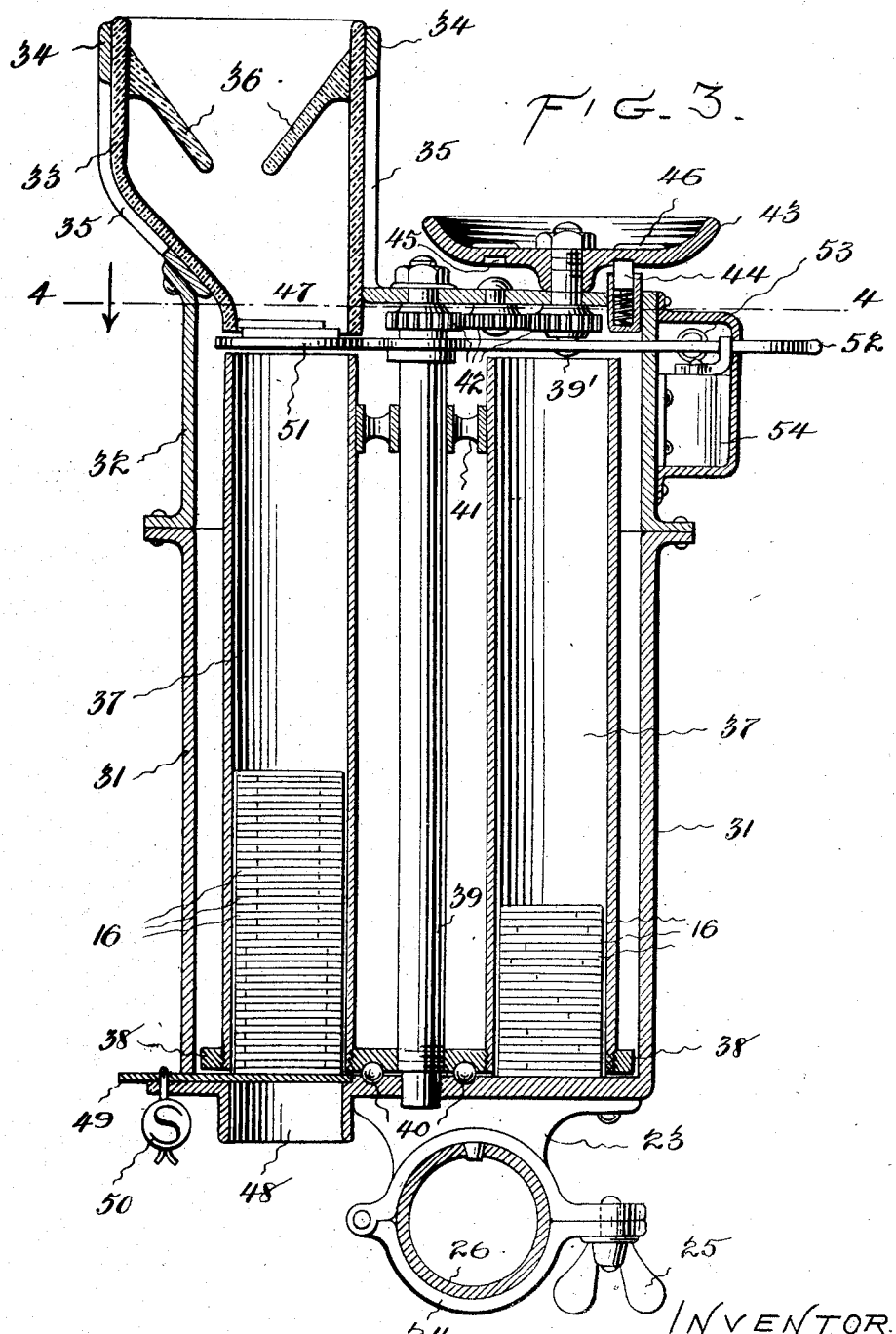

April 19, 1927.  
A. J. TANNER  
1,625,170  
RAILWAY AND LIKE FARE SYSTEM AND MEANS USED THEREWITH  
Original Filed Sept. 19, 1919  3 Sheets-Sheet 3
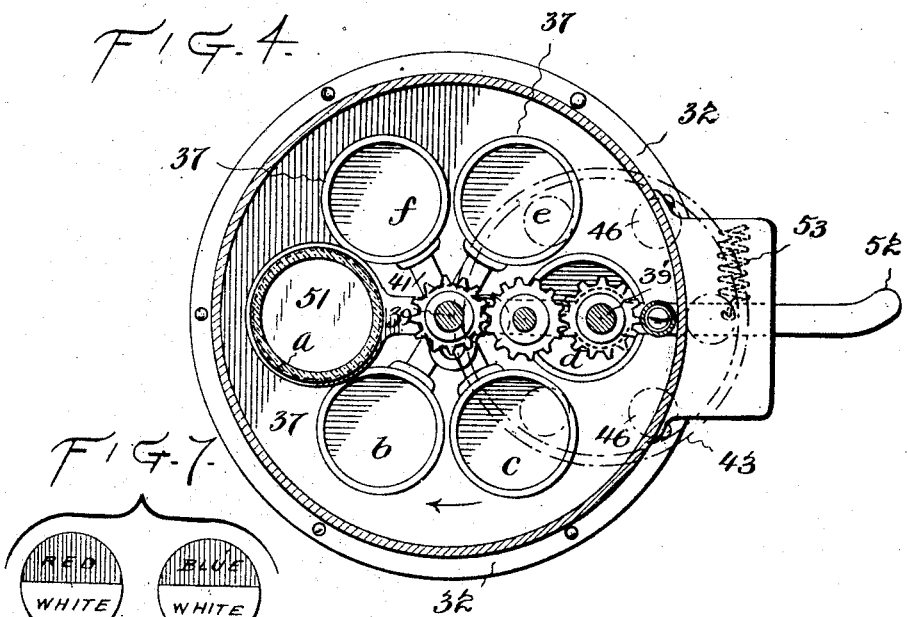
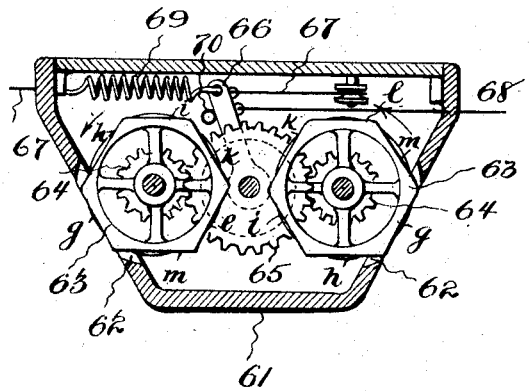
INVENTOR.  
Arnold J. Tanner Patented Apr. 19, 1927.

1,625,170

UNITED STATES PATENT OFFICE.

ARNOLD J. TANNER, OF NORTH HAVEN, CONNECTICUT, ASSIGNOR, BY MESNE ASSIGN-
MENTS, TO SIDNEY S. GORHAM, TRUSTEE, OF CHICAGO, ILLINOIS.

RAILWAY AND LIKE FARE SYSTEM AND MEANS USED THEREWITH.

Application filed September 19, 1919, Serial No. 325,011. Renewed January 7, 1926.

The present invention relates to railway and like fare systems, and the object of the invention is to provide a simple and efficient apparatus useful for assessing, indicating and checking the variable or fluctuating fare values of multiple stage or zone fare collection systems. The invention hereinafter set forth, consists of the apparatus having the several members or parts thereof arranged in a definite order or relation toward each other, and each operating member being capable of separate adjustment and operation in a determinable manner so as to maintain the established order with each other, and with the defined stages of a given route. The apparatus designed for use with a complete operative fare system, such as hereinafter described, comprises fare-checking devices of the nature of tokens having differentiating characteristics whereby different stages or zones are permanently designated. The apparatus further comprises means for segregatively delivering and receiving said tokens, and also means for indicating the variable fare values represented by said tokens at all times during the stages of travel in a given journey.

In accordance with the present invention, as applied to a public passenger service zone fare system, each route or division of the system is divided into zones, each zone being given a differentiating mark or name, desirably names by colors, for example; red, white, blue and other distinct colors or combinations of colors when there are a greater number of zones. In carrying out an application of the improved system, a passenger when boarding the vehicle, receives a device in the form of a ticket, token or check of a color corresponding to the color of the zone in which the passenger boarded the vehicle. This device is retained by the passenger and when the destination is reached and the passenger is about to leave the vehicle, the device is given up. The fare is then assessed and paid according to the number of zones or any part of a zone traversed. For example, it may be assumed the system has three zones, numbered one, two and three of the up journey and reversed in the down journey, and said zones being designated by the colors red, white and blue. A passenger boarding the vehicle in the red zone and alighting in the same zone would pay the minimum fare, say five cents. A journey by the same passenger within the white zone would require payment of a ten cent fare and for a journey by the same person ending within the blue zone, fifteen cents or the maximum fare is payable. When the vehicle reaches the next or white zone, a passenger boarding the vehicle in this zone pays a five or ten cent fare respectively for a journey commencing and ending within the white and blue zones. A ride commencing and ending within the blue zone requires payment of a five cent fare and in the blue zone holders of white and red devices pay respectively ten and fifteen cents, when alighting in the blue zone.

The color designation of the zones never changes and for the down or return journey of the vehicle, the fares are charged as before, only in a reverse order for example; a ride commencing within the blue zone and ending within the red zone would necessitate payment of the maximum or fifteen cent fare.

Owing to the simplicity of the fare system and the improved apparatus provided therefor and hereinbefore described, an experienced operator may readily calculate the amount of the fare payable between any two points, but so that the passenger may ascertain the amount of the fare payable, a progressively actuatable fare indicator is provided as part of the apparatus employed for carrying the improved system into effect.

The improved system and illustrative constructions of apparatus used therewith will be described hereinafter with reference to the accompanying drawings wherein—

Figures 1 and 2 represent respectively a plan view in section taken on the line 1—1 of Figure 2 and a vertical section taken on line 2—2 of Figure 1, illustrating one form of the distributor or means for delivering the fare tokens, checks or other fare and zone indicating devices.

Figure 3 is a longitudinal vertical and centrally taken section illustrating one form of the deposit box in which the fare and zone indicating devices are collected.

Figure 4 is a plan view in section taken on the line 4—4 of Figure 3.

Figure 5 illustrates one form of indicating apparatus whereby the passenger may ascertain the amount of the fare or fares chargeable within an indicated zone.

Figure 6 illustrates diagrammatically the arrangement of the indicating matter upon a movable drum or drums of said indicating apparatus, and Figure 7 illustrates proposed color schemes to be applied to the fare and zone indicating devices when more than three lots of devices are used.

Referring first to Figures 1 and 2 of the drawings, the illustrated token delivering means or distributor comprises the casing 1 having the permanently closed top 2. An inlet opening 3 in said top provides the only means of access to the interior of the casing 1 and which opening 3 is covered by plate 4 rotatable on the boss 5 to bring the opening 6 into a position so as to register with the opening 3. Said plate is capable of being locked by lock 4' when the opening 3 is closed.

A spider frame is composed of the vertical shaft 7 and clamps 8, the latter being secured to the shaft 7 and carries a plurality of tubular containers or receptacles 9. These tubular members 9 are secured to the base plate 10 and which plate, together with the tubular members and the spider frame, turn as one unit on the step bearing 11 preferably seated on ball bearings 12.

The said unit is rotated by means of the external hand wheel 13 and said plate 10 is provided with notches 14 which successively engage a spring detent 15, whereby determined intermittent rotation of said unit may be effected preferably and only in the direction indicated by the arrow $x$ so as to successively bring the tubes or pockets 9 into alignment with the opening 3, through which the said tubes are filled with their respective disks 16. These disks are discharged, one at a time, through the central opening 17 in the plate 10 by means of spring plunger 18 being pushed through slit 19 and in its forward travel pushing the lowermost disk through slot 20. The disk so displaced will fall through the opening 17 into the chute 21 from whence it is taken by the passenger. An operation of the plunger 19 is required for each disk delivered and therefore a counter 22 operatively connected with the plunger in a known manner, will provide means for counting the passengers.

The casing of the chute 21 is firmly fastened to the casing 1 of the box and a clamp 23 having hinged section 24 and wing nut 25 provides convenient means for detachably securing the apparatus to a fixed base, for example the rail 26 employed to define ingress and egress passages for the passengers.

In operation as in construction, the aforesaid distributing apparatus is simple. Assuming the vehicle is on the up journey and in zone one, designated as the red zone, the operator, who may be the motorman stationed on the front end of the car, pushes the plunger inwardly to deliver red disks to the passengers boarding the car in the red zone. When the vehicle reaches the white zone, or zone two, the operator by sense of feeling alone, if necessary, partially rotates the hand wheel until the next notch 14 is engaged by the detent 15. The tube 9, containing the white disks, is then brought into an operative position relatively to the plunger 18 and a similar change in the delivering means is made for each of the other zones. When the vehicle is on the return or down trip, the last setting of the apparatus for the up trip, will serve for the first zone of the down trip because the tube containing the blue disks is then in an operative position with the plunger 18.

The token receiving means or deposit box constituting a part of the present invention is illustrated in Figures 3 and 4. Herein the apparatus includes a casing 31 having a permanently closed top 32, on which hopper 33 is mounted. This hopper is composed of glass and is protected by a metallic frame 34 having openings 35 through which the contents of the hopper may be inspected and baffle plates 36 being provided to deter extraction of fare tokens or coins deposited in the hopper. Other known means may be employed for preventing surreptitious removal of the contents of the hopper and the deposit box.

A rotary member somewhat similar to the rotary member of the distributing apparatus, above described, is employed in this receiving apparatus, but with the difference that there are two tubular receptacles 37 to each delivering tube 9 of the distributor for reasons hereinafter explained. The tubes 37 are open at the top and bottom, the lower ends being threaded in openings of the base plate 38 and which plate is mounted on shaft 39 so as to rotate therewith on bearings 40. The upper ends of the tubes 37 are secured by spider frame 41 to the shaft 39 and which shaft is intermittently turned through the train of gears 42 by means of hand wheel 43, which may be rotated in one direction only and known means, (not shown) are provided to count each complete revolution of said wheel. Rotation of this wheel is arrested in intermittent positions by successive engagement of the plunger detent 44 with the notches 45 in the under side of said wheel 43. Markers 46 provide means for guiding the setting of the hand wheel 43 and with it the rotary member, whereby the tubular receptacles 37 are selectively and successively brought into alignment with the open neck 47 of the hopper 33 and also with the discharge opening 48, at the bottom of the casing 31 for the purpose of removing the contents of said tubular receptacles. The said opening 48 is closed by sliding plate 49 locked and preferably sealed by seal 50.

Communication between the open neck 47 of the hopper and the receptacle 37 registering therewith, is closed by movable plate 51, which is turned on the pivotal point provided by stud 39' through manipulation of the externally projecting end 52 of the plate 51, to open the passage between the hopper and the registering receptacle, thus permitting the contents of the hopper, after inspection, to fall into the said receptacle. A spring 53 returns the plate 51 to the normal position for closing the passage from the hopper and each operation of the plate is registered by means of counter 54 whereby a checking count of passengers may be obtained.

The operation and setting of the hereinbefore described deposit box is practically the same as that of the distributing means. Assuming the vehicle is travelling in the red zone of the up trip, in this case, the receptacle $a$ registers with the hopper. At this stage of the journey only red disks have been delivered and naturally only such colored disks can be deposited in the box, and in checking, each disk contained in receptacle $a$, represents five cents in value. When the car reaches the white zone the rotating member of the apparatus, is turned so that receptacle $b$ registers with the hopper. Both red and white disks may be deposited in receptacle $b$ and each red disk therein represents ten cents in value and each white disks represents five cents. In the blue zone, of the up trip, receptacle $c$ must register with the hopper and the blue, white and red disks therein represent values respectively five, ten and fifteen cents.

On the return or down trip, receptacle $d$ first registers with the hopper and a blue disk deposited therein, represents a five cent fare. The progressive operation of the rotary member is the same as before, the receptacles $e$ and $f$ being successively brought into registration with the hopper and in receptacle $f$, red, white and blue disks deposited therein will represent values respectively five, ten and fifteen cents.

Obviously coins in payment of the fares may be deposited with the disks if the takings are not required by the operator for making change.

It is also obvious, since the rotary members of the distributor and the deposit box, in a proper operation thereof, always rotate in one direction, any suitable means to restrict operation in a reverse direction may be employed, and also means may be provided to count the number of rotations of said members. Such means will discourage improper manipulation of the apparatus. An authorized collector may conveniently discharge the contents of the tubular receptacles into separate envelopes capable of being sealed and marked for identification by the operator who is responsible for the fare takings.

To render carrying out of the improved fare system more complete, it is desirable the passengers should be able to readily ascertain the fare chargeable from the point of entry to their destination and for this purpose a fare indicator is provided. This indicator is located at an elevated point preferably midway in the vehicle and is readable on two sides so that passengers in any part of the vehicle may read the indications displayed by the indicator.

The indicator comprises an angular shaped casing 61 having openings 62 through which one face of each of a pair of indicating drums 63 is visible. These drums are rotated progressively and intermittently in the same direction by gears 64 through driving gear 65 which is intermittently rotated by lever 66. This lever is operated through a ratchet device in a known manner from either end of the vehicle, through the medium of pull cords 67 and 68, spring 69 returning the said arm to its normal position against stop 70.

Figure 6 illustrates the arrangement of the indicating matter on one of the drums. The indicating matter on the other drum is the same only it is arranged in reversed order to conform with the reversed rotation of the other drum.

The operation of the improved indicating apparatus is simple and its indications are easily read. When the vehicle is travelling in the red zone, face $g$ is displayed on each indicating drum and announces that the vehicle is in the red zone and a five cent fare is payable by holders of red disks. Face $h$ is displayed when the car enters the white zone and face $i$ is shown when the blue zone is reached. In both instances the progressive increase of the fare chargeable for the different colored disks is correctly indicated. The faces $k$, $l$ and $m$ are successively displayed during the return or down trip of the vehicle to indicate the zones and fare values as illustrated.

The hereinbefore described system and means or apparatus collectively provide in themselves efficient and adequate means for indicating the fluctuating fares chargeable and by means of the segregated retention of the returned tokens or fare devices, a precise record of the takings is maintained. The token fare devices, need not be handled by the operator therefore the distributing apparatus may have a capacity great enough so that the operator may have need only to recharge the apparatus in exceptional cases of emergency, and then the charging will be done in bulk so that a disk may not be held back and be improperly handed to an accomplice. These disks it will be understood are of a convenient size and are composed of any suitable material. Also they are marked so to serve to denote ownership and purpose and to render them difficult to counterfeit.

It will be understood the deposited tokens or checks indicate the amount of the fare the passenger must pay and it is necessary that the attendant should be able to readily inspect the tokens or checks after they are deposited. Because of their individual distinctive characteristics, even if several tokens or checks are deposited at one time through the comparatively large opening of the receiving hopper, checking is permissible and an irregularity would be detected. However, should it be found necessary to limit deposit to one token at a time, the opening in the hopper would be restricted so as to be capable of receiving only one token at a time.

In established systems, where a universal fare is collected and registered by means of a registering fare box, by an indicating fare register or by any other similar means, such established system may readily be converted into a zone fare collection system and the registering and indicating means employed therewith may be retained and used with advantage in conjunction with the zone fare system and apparatus described herein. When a registering fare-box is employed with the improved system and means, instead of the cash being taken directly or first handled by the attendant, the correct amount in cash or the equivalent, is dropped into the fare box, by the passenger and thus registered and retained. But, if desired, after registration, the cash may be accessible for the purpose of making change.

I claim—

1. In a zone fare system as described employing tokens possessing differentiating characteristics whereby various zones are indicated, a token distributer having a plurality of token retaining compartments corresponding to the zones in which the vehicle travels, means for delivering a token from a compartment corresponding to the zone in which a passenger boards the vehicle, a token deposit box having a token receiving hopper and receiving compartments corresponding to the compartments of the token delivering means and means to position said receiving compartments one at a time beneath the hopper in accordance with the zone in which the vehicle is then traveling.

2. In a zone fare system as described employing tokens possessing differentiating characteristics whereby various zones are indicated, a token distributer having a movable member provided with a plurality of retaining compartments corresponding to the zones in which the vehicle travels, means for delivering a token from a compartment corresponding to the zone in which a passenger boards the vehicle, said means comprising an ejecting device arranged to be placed in an operative relation with any one of said compartments whereby tokens are ejected one at a time from said compartment, a token deposit box having a token receiving hopper and a movable member provided with receiving compartments corresponding to the compartments of the token delivering means and said movable member being arranged to be moved into and held in adjusted positions.

3. In a zone fare system as described employing tokens possessing differentiating characteristics whereby various zones are indicated, a token distributer having a plurality of token retaining compartments corresponding to the zones in which the vehicle travels, means for delivering a token from a compartment corresponding to the zone in which a passenger boards the vehicle, a token deposit box having a token receiving hopper and receiving compartments corresponding to the compartments of the token delivering means, means to position said receiving compartments one at a time beneath the hopper in accordance with the zone in which the vehicle is then traveling, an indicating means comprising a movable member having a plurality of faces corresponding to the compartments of the token delivering means and deposit box, and means to position said movable member to expose said faces one at a time in accordance with the zone in which the vehicle is then traveling.

4. Fare collection apparatus comprising a zone token distributing mechanism and a zone token collecting mechanism each having a revoluble turret carrying a plurality of tubes each adapted to contain a pile of permanent tokens, and means for revolving the turrets to present tubes in operative position in accordance with the zone through which the car is passing.

Signed at North Haven, in the county of New Haven and State of Connecticut, this 18th day of September A. D. 1919.

ARNOLD J. TANNER.